United States Patent [19]

Lüders et al.

[11] 4,174,340

[45] Nov. 13, 1979

[54] PLASTIC MOLDING COMPOSITION CONTAINING A FILLER

[75] Inventors: Walter Lüders, Neu-Isenburg; Walter Herwig, Bad Soden am Taunus; Ulrich van Spankeren, Hofheim am Taunus; Karlheinz Burg, Wiesbaden, all of Fed. Rep. of Germany

[73] Assignee: Hoechst Aktiengesellschaft, Frankfurt am Main, Fed. Rep. of Germany

[21] Appl. No.: 930,397

[22] Filed: Aug. 2, 1978

[30] Foreign Application Priority Data

Aug. 4, 1977 [DE] Fed. Rep. of Germany ....... 2735160

[51] Int. Cl.$^2$ .......................... C08K 3/26; C08K 5/53; C08K 9/04
[52] U.S. Cl. .............................. 260/42.14; 260/42.37; 260/42.39; 260/42.45
[58] Field of Search ............... 260/42.14, 42.37, 42.45, 260/42.39

[56] References Cited

U.S. PATENT DOCUMENTS

| | | | |
|---|---|---|---|
| 2,516,168 | 7/1950 | Woodstock | 260/45.7 PT X |
| 3,023,180 | 2/1962 | Canterino et al. | 260/42.39 X |
| 3,058,944 | 10/1962 | Breslow et al. | 260/42.39 |
| 3,272,772 | 9/1966 | Russell | 260/42.14 |
| 3,362,924 | 1/1968 | Eastman | 260/42.39 |
| 3,370,029 | 2/1968 | Cannelonga | 260/45.7 PT X |

*Primary Examiner*—Sandra M. Person
*Attorney, Agent, or Firm*—Curtis, Morris & Safford

[57] ABSTRACT

In the case of polyolefins filled with alkaline earth metal carbonates, a very good compatibility of the hydrophilic filler and the hydrophobic polymer matrix is reached when using as adhesion promoters certain organo-phosphorus compounds. As a result, improved mechanical properties are obtained with the articles made of plastic material that has been prepared from such polyolefin molding compositions.

3 Claims, No Drawings

PLASTIC MOLDING COMPOSITION CONTAINING A FILLER

The present invention relates to a plastic molding composition containing a filler.

As has already been described, the mechanical, electrical and thermal properties of plastic materials can be improved by adding inorganic fillers. However, due to their hydrophilic properties, these fillers show only a low compatibility with the mostly hydrophobic polymers. In the case of polymers filled with inorganic substances, this leads to a deterioration of some mechanical properties.

It has already been proposed to treat natural calcium carbonates with surface-active substances in order to improve their dispersibility in plastic materials. These substances comprise saturated and unsaturated fatty acids having a medium or high molecular weight, for example, butyric acid, lauric acid, oleic acid, and stearic acid (cf. German Patent Specification No. 958 830).

It has been known to use a calcium carbonate treated with stearic acid as impact resistant component in the preparation of impact resistant unplastiziced shaped articles on the basis of polyvinyl chloride (cf. German Auslegeschrift No. 1 469 886).

It has also been proposed to combine calcium carbonate with compounds which contain an ethylene bond in the molecule and with free radical forming agents (cf. German Offenlegungsschriften Nos. 1 794 310 and 20 61 180).

Finally it has also been described to react alkaline earth metal carbonates with at least one unsaturated carboxylic acid, while stirring, in the absence of liquid water in the pulverulent inorganic material. In this process, free radical forming agents may be present (cf. German Auslegeschrift No. 22 62 126).

It has become evident, however, that the improvements of the mechanical properties obtained by using modified alkaline earth metal carbonates are not yet sufficient, especially for polyolefins.

It has now been found that a very good compatibility between the hydrophilic filler and the hydrophobic polymer matrix is reached, which results in improved mechanical properties of plastic material articles prepared thereof, when using an adhesion promoter certain organo-phosphorus compounds.

The present invention provides a plastic molding composition containing a filler, which composition consists of
from 20 to 90 parts by weight of a polyolefin,
from 10 to 80 parts by weight of an alkaline earth metal carbonate,
common additives as well as from 0.1 to 10% by weight, calculated on the filler, of an adhesion promoter, said adhesion promoter being an organo-phosphorus compound of the formula

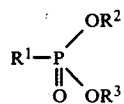

(I)

in which $R^1$ is an alkyl radical having from 1 to 18 carbon atoms, an alkenyl radical of from 2 to 18 carbon atoms, an aralkyl radical of from 7 to 13 carbon atoms, whose alkyl chain has from 1 to 3 carbon atoms, or an aralkenyl radical of from 8 to 13 carbon atoms, whose alkenyl chain has 2 or 3 carbon atoms, and $R^2$ and $R^3$, which are identical or different, represent hydrogen, an alkyl radical of from 1 to 8 carbon atoms, an aryl radical of from 6 to 10 carbon atoms, an aralkyl radical of from 7 to 13 carbon atoms, whose alkyl chain has from 1 to 3 carbon atoms, or an alkenyl radical of from 3 to 5 carbon atoms.

The organo-phosphorus compounds of the formula (I) to be used according to the invention are phosphonic acids and the esters thereof. In formula (I) $R^1$ is an alkyl radical of from 1 to 18, preferably 3 to 8, especially 2 to 6 carbon atoms. The alkyl radical may be straight-chained or branched or cyclic. $R^1$ represents also an alkenyl radical of from 2 to 18, preferably 2 to 12 carbon atoms, or an aralkyl radical of from 7 to 13, preferably 7 to 10, especially 7 to 9 carbon atoms, whose alkyl chain has from 1 to 3, preferably 1 or 2 carbon atoms, or an aralkenyl radical of from 8 to 13, preferably 8 to 10, especially 8 or 9 carbon atoms, whose alkenyl chain has 2 or 3 carbon atoms. The aromatic radical is a carbocyclic nucleus having 6 or 10 cyclic carbon atoms which may carry lateral chains. $R^2$ and $R^3$ are identical or different and each represent hydrogen, an unbranched or branched or cyclic alkyl radical having from 1 to 8, preferably 2 to 8 carbon atoms, an aryl radical of from 6 to 10, preferably 6 to 8 carbon atoms, an aralkyl radical of from 7 to 13, preferably 7 to 10 carbon atoms, whose alkyl chain has from 1 to 3, preferably 1 or 2 carbon atoms, or an alkenyl radical of from 3 to 5, preferably 3 or 4 carbon atoms. Aromatic radicals are preferably carbocyclic nuclei with 6 or 10 cyclic carbon atoms which may carry lateral chains.

The phosphonic acids and phosphonic acid esters to be used in accordance with the invention may be prepared according to known methods.

Thus, for example, the phosphonic acids may be prepared from their tetra- or dihalides by a reaction with water, by saponification of the corresponding esters, by the disproportionation of phosphonous acids or by the addition of phosphorous acid to olefinic double bonds; the phosphonic acid esters may be prepared by reacting the phosphonic acid-tetra- or -dihalides with alcohols or from esters of phosphorous acid with alkyl halides (Kosolapoff, Organophosphorous Compounds, Wiley and Sons, New York, 1950; Houben-Weyl, vol. XXI/1, Thieme Verlag Stuttgart).

Suitable phosphonic acids are, for example, methane-phosphonic acid, ethane-phosphonic acid, propane-phosphonic acid, butane-phosphonic acid, n-hexane-phosphonic acid, cyclohexane-phosphonic acid, 2,3-dimethyl-butane-phosphonic acid, octane-phosphonic acid, decane-phosphonic acid, dodecane-phosphonic acid, octadecane-phosphonic acid, phenylmethane-phosphonic acid, 2-phenylethane-phosphonic acid-1, vinyl-phosphonic acid, allyl-phosphonic acid, 1-phenyl-vinyl-phosphonic acid-1, 2-phenylvinyl-phosphonic acid-1, 2,4-dimethyl-4-methyl-pentane-phosphonic acid, dimethyl-2-methylpropane-phosphonic acid and 2,4-dimethyl-butane-phosphonic acid. There are preferably used vinyl-phosphonic acid, propane-phosphonic acid, hexane-phosphonic acid, octane-phosphonic acid, dodecane-phosphonic acid, 2,4-dimethyl-4-methyl-pentane-phosphonic acid, dimethyl-2-methylpropane-phosphonic acid and 2,4-dimethyl-butane-phosphonic acid.

Suitable phosphonic acid esters are, for example, methane-phosphonic acid-diethyl ether, ethane-phosphonic acid-diethyl ester, ethane-phosphonic acid-dibutyl ester, butane-phosphonic acid-dibutyl ester, n-hexane-phosphonic acid-diethyl ester, n-hexane-phosphonic acid-diphenyl ester, octane-phosphonic acid-diethyl ester, dodecane-phosphonic acid dimethyl ester, octadecane-phosphonic acid-diethyl ester, vinyl-phosphonic acid-diethyl ester, vinyl-phosphonic acid-di-(2-ethyl-hexyl)-ester, vinyl-phosphonic acid-dioctyl ester, vinyl-phosphonic acid-diallyl ester, allyl-phosphonic acid-diallyl ester, allyl-phosphonic acid-dimethallyl ester, phenylmethane-phosphonic acid-monoethyl ester, methane-phosphonic acid-ethylhexyl ester. Preference is given to butane-phosphonic acid-dibutyl ester, vinyl-phosphonic acid-diallyl ester, vinyl-phosphonic acid-dimethyl ester and vinyl phosphonic acid-dioctyl ester.

The phosphonic acids and phosphonic acid esters to be used according to the invention are added to the molding composition in an amount of from 0.1 to 10% by weight, preferably from 0.5 to 2% by weight, calculated on the filler. There may also be used mixtures of different phosphonic acids or phosphonic acid esters or mixtures of phosphonic acids with phosphonic acid esters.

The filler may be a natural or synthetic, i.e. precipitated alkaline earth metal carbonate. Suitable carbonates are, for example, limestone powder, chalk, precipitated calcium carbonate, natural magnesite, natural hydromagnesite, synthetic basic magnesium carbonate, calcium-magnesium carbonate, dolomite. Preference is given to the calcium carbonates. The alkaline earth metal carbonates to be used according to the invention have an average particle diameter of from 0.1 to 50 $\mu$m, preferably from 1 to 10 $\mu$m. There may also be used mixtures of different alkaline earth metal carbonates.

The incorporation of the phosphonic acid or the phosphonic acid ester into the molding composition may be effected according to various methods.

Thus, for example, the filler may be suspended in an organic solvent; as solvents there may be used alcohols, such as methanol, ethanol, butanol; hydrocarbons, such as hexane, benzene, toluene; ethers, such as diethyl ether, di-isopropyl ether, or ketones, such as acetone or diethyl ketone. It is also possible to add the adhesion promoter directly or dissolved in a suitable solvent, to stir the mixture thoroughly at room temperature or elevated temperature, to eliminate the solvent by distillation and to dry the residue. The filler may also be thoroughly mixed with the adhesion promoter in a mixer at room temperature or at elevated temperature, the temperature optionally being above the melting point of the adhesion promoter.

If the adhesion promoter is liquid, it may be added dropwise to the filler directly or diluted with an appropriate solvent in a high-speed mixer, or may be sprayed in the form of a mist by means of a spray nozzle onto the filler. In this way it is possible to apply also solid adhesion promoters dissolved in a suitable solvent onto the filler.

Alternatively, the adhesion promoter may be mixed with the polymer in a mixer and the untreated filler can subsequently be added, or all three components, i.e. the polymer, the filler and the adhesion promoter, may be mixed simultaneously. This simultaneous mixing may be carried out in a pre-mixer, but also in a granulating extruder.

According to a preferred method the filler is first treated with the adhesion promoter.

The filler is admixed to the polymer in an amount of from 10 to 80% by weight, preferably 30 to 70% by weight.

For the plastic molding compositions of the invention there are suitable as basic polymers 1-olefin-homo- and copolymers, for example polyethylene of high density and low density, polypropylene, polybutene-1, poly-(4-methyl)-pentene-1, olefin copolymers, such as ethylene-propylene copolymers and ethylene-butene copolymers, mixtures of these polymers and mixtures of these polymers with caoutchouc-like polymers. Polyethylene is particularly preferred.

The content of polymer in the molding composition is from 20 to 90, preferably from 30 to 70% by weight.

The molding compositions of the invention may contain the common additives which facilitate the further processing and improve the physical properties. There are to be mentioned light and heat stabilizers, antioxidants, antistatic agents, etc. as well as coloring pigments and flameproofing agents. The former group is generally contained in the molding compositions in an amount of from 0.01 to 5% by weight, calculated on the amount of polymer and the filler. The coloring pigments and flameproofing agents are used in an amount which corresponds to the requirements.

An effective stabilizer combination for poly-1-olefins, such as high, medium and low pressure polymers of $C_2$ to $C_4$-1-olefins, especially polyethylene and polypropylene, or for copolymers of such 1-olefins may for example consist—each calculated on 100 parts by weight of polymer—of from 0.05 to 4 parts by weight of a phenolic stabilizer, optionally from 0.01 to 4 parts by weight of a sulfur-containing co-stabilizer, and optionally from 0.01 to 3 parts by weight of a basic or neutral metal soap, for example calcium stearate or zinc stearate, as well as optionally from 0.1 to 4 parts by weight of a phosphite, and optionally from 0.01 to 4 parts by weight of a known UV-stabilizer from the group of alkoxyhydroxy-benzophenones, hydroxyphenyl-benzotriazoles, benzylidene-malonic acid-mononitrile esters or the so-called quenchers (for example nickel chelates).

If an olefinically unsaturated phosphonic acid or a corresponding ester is used as modifying agent, a polymerization initiator, for example, benzoyl peroxide, dicumyl peroxide, tert.-butyl-hydroperoxide, tert.-butyl-peroctoate, azobis-isobutyronitrile, may be added in an amount of from 0.01 to 1% by weight, calculated on the amount of unsaturated phosphonic acid or phosphonic acid ester.

Shaped articles which have been manufactured from the thermoplastic molding composition of the invention show a very good impact strength and tensile impact strength, which makes them especially suitable for the production of technical articles.

Another advantage of the adhesion promoters to be used according to the invention is to be seen in the fact that they have a favorable influence on the flow properties of the polymer melt in the injection molding process and facilitate for example the charging of the mold when manufacturing complicated injection molded pieces.

The following Examples serve to illustrate the present invention in detail.

EXAMPLE 1

450 Parts of calcium carbonate of the calcite type having an average particle diameter of 5 $\mu$m and a specific surface according to the BET method (Brunauer, Emmet, Teller, J.Am.Chem.Soc. 60, 309) of 1 m²/g are suspended in 2000 parts of acetone. 50 Parts of vinylphosphonic acid are added dropwise, while stirring thoroughly, within 30 minutes. The suspension is stirred for 2 hours at room temperature, subsequently the acetone is distilled off in vacuo and the residue is dried at 40° C. in the vacuum drying cabinet.

450 Parts of the calcium carbonate thus treated are thoroughy mixed with 1050 parts of polyethylene (density of 0.96 g/cm³, melting index of 23 g/10 min., containing 0.42% by weight of a phenolic stabilizer and 2.5% by weight of a sulfur-containing co-stabilizer) in a plowshare mixer. The mixture obtained is extruded to a strand in a double screw extruder, which strand is then granulated in a cutting machine. By means of an injection molding machine, test samples are prepared from the granules.

In a comparison example, 450 parts of untreated calcium carbonate are mixed in the same manner with 1050 parts of polyethylene. The mixture is further processed, as has been described above.

The properties of the test samples have been indicated in Table I, ½ standard rod serving as test sample.

The elongation and tensile strength are determined according to DIN 53 455, the impact strength according to DIN 53 453 (jaw distance 30 mm, transverse position), the tensile impact strength according to DIN 53 448, the ball indentation hardness according to DIN 52 456, and the E-module according to DIN 53 457.

EXAMPLES 2 to 14

The same calcium carbonate as in Example 1 is treated with different phosphonic acids and/or phosphonic acid esters in different concentrations—calculated on the amounts of calcium carbonate. 300 Parts of the calcium carbonate thus treated are mixed with 700 parts of also the same polyethylene, and the mixture is processed as has been described in Example 1. The properties of the test samples have been specified in Table II.

EXAMPLE 15

500 Parts of calcium carbonate of the calcite type having an average particle diameter of 5 μm and a specific surface (BET) of 1 m²/g and 7.5 parts of octane-phosphonic acid are mixed in a high-speed mixer at 800 rpm at 80° C. for 30 minutes.

450 Parts of the calcium carbonate thus treated are mixed thoroughly with 1050 parts of polyethylene (density of 0.96 g/cm³, melting index of 23 g/10 min) in a plow-share mixer. The further processing of the mixture is effected as has been described in Example 1. The properties of the test samples have been specified in Table III.

TABLE II

Adhesion promoter $$R^1-P\begin{matrix} O-R^2 \\ \| \\ O \end{matrix} O-R^3$$

| $R^1$ | $R^2, R^3$ | content | elongation % | tensile strength N/mm² | impact strength mJ/mm² | tensile impact strength mJ/mm² |
|---|---|---|---|---|---|---|
| $C_3H_7-$ | H | 1% | 44 | 22 | w/o b.[3] | 110 |
| $C_6H_{13}-$ | H | 0.8% | 42 | 24 | w/o b. | 110 |
| $C_8H_{17}-$ | H | 1.5% | 40 | 23 | w/o b. | 110 |
| $CH_3-CH-CH-CH_2$<br>        \|    \|<br>        $CH_3$  $CH_3$ | H | 0.7% | 30 | 24 | w/o b. | 110 |
| $C_{12}H_{25}-$ | H | 5% | 40 | 24 | w/o b. | 100 |
| $C_{12}H_{25}-$ | H | 1.5% | 44 | 23 | w/o b. | 120 |
| $C_{18}H_{37}-$ | H[1] | 0.7% | 46 | 26 | w/o b. | 120 |
| $CH_2=CH-$ | $-CH_2-CH=CH_2$ | 5% | 32 | 30 | w/o b. | 130 |
| $CH_2=CH-$ | $-CH_2-CH=CH_2$ | 8% | 29 | 27 | w/o b. | 130 |
| $C_{12}H_{25}-$ | H | 7% | 40 | 24 | w/o b. | 110 |
| $CH_2=CH-$ | $-CH_3$[2] | 6.5% | 40 | 26 | w/o b. | 130 |
| $CH_2=CH-$ | $-C_8H_{17}$ | 1% | 38 | 24 | w/o b. | 130 |
| $CH_2=C-$<br>   \|<br>  $C_6H_5$ | H | 3% | 28 | 26 | 120 | 110 |

[1] in methanol
[2] in diethyl ether
[3] w/o b. = withoutbreaking

TABLE I:

| adhesion promoter | elongation % | tensile strength N/mm² | impact strength mJ/mm² | tensile impact strength mJ/mm² | E-module ·10³ N/mm² | ball indentation hardness N/mm² |
|---|---|---|---|---|---|---|
| — | 22 | 23 | 65 | 80 | 0.7 | 43 |
| vinyl-phosphonic acid | 30 | 28 | without breaking | 130 | 0.64 | 44 |

EXAMPLE 16

Example 15 is repeated, with the difference that instead of octane-phosphonic acid there are used 3 parts of dodecane-phosphonic acid for the modification of the calcium carbonate. The properties of the test samples have been specified in Table III.

EXAMPLE 17

By means of a spray nozzle, a solution of 5 parts of octadecane phosphonic acid in 50 parts of acetone is sprayed within 30 minutes onto 500 parts of calcium carbonate of the calcite type having an average particle diameter of 5 $\mu$m and a specific surface (BET) of 1 $m^2/g$ in a high-speed mixer at 1200 rpm.

450 Parts of the calcium carbonate thus treated are thoroughly mixed with 1050 parts of polyethylene (density of 0.96 $g/cm^3$, melting index of 23 g/10 min., containing 0.42% by weight of a phenolic stabilizer and 2.5% by weight of a sulfur-containing co-stabilizer) in a plowshare mixer. The further processing of the mixture is effected as has been described in Example 1. The properties of the test samples have been specified in Table III.

EXAMPLE 18

Example 17 is repeated, with the difference that instead of octadecane-phosphonic acid there are used 5 parts of vinylphosphonic acid-bis-(2-ethyl-hexyl)-ester without solvent. The further processing of the mixture is effected as has been described in Example 1. The properties of the test samples have been specified in Table III.

EXAMPLE 19

Example 17 is repeated, with the difference that instead of octadecane-phosphonic acid there are used 10 parts of vinyl-phosphonic acid. The further processing of the mixture is effected as has been described in Example 1. The properties of the test samples have been indicated in Table III. In accordance with Example 15, a mixture of untreated calcium carbonate and polyethylene is prepared as comparison sample.

TABLE III

| Example | elongation % | tensile strength N/mm² | impact strength mJ/mm² | tensile impact strength mJ/mm² |
|---|---|---|---|---|
| comparison | 23 | 22 | 68 | 80 |
| 15 | 39 | 21 | w/o b. | 110 |
| 16 | 46 | 21 | w/o b. | 110 |
| 17 | 46 | 26 | w/o b. | 120 |
| 18 | 40 | 24 | w/o b. | 130 |
| 19 | 42 | 26 | w/o b. | 130 |

EXAMPLE 20

500 Parts of calcium carbonate of the calcite type having an average particle diameter of 1.5 $\mu$m and a specific surface (BET) of 7 $m^2/g$ are suspended in 2500 parts of n-hexane. Within 30 minutes, 12.5 parts of vinyl-phosphonic acid are added dropwise, while stirring thoroughly. The suspension is continued to be stirred for 3 hours at room temperature; subsequently the hexane is distilled off in vacuo, and the residue is dried at 40° C. in the vacuum drying cabinet. 450 Parts of the calcium carbonate thus treated are mixed thoroughly with 1050 parts of polyethylene (density of 0.96 $g/cm^3$, melting index of 23 g/10 min., containing 0.42% by weight of a phenolic stabilizer and 2.5% by weight of a sulfur-containing co-stabilizer) in a plowshare mixer. The mixture obtained is extruded in a double screw extruder to give a strand which is then granulated in a cutting machine. By means of an injection molding machine, test samples are prepared from the granules.

In a comparative example 450 parts of untreated calcium carbonate are mixed with 1050 parts of polyethylene in the same manner and are then further processed.

The properties of the test samples have been specified in Table IV.

EXAMPLE 21

500 Parts of precipitated calcium carbonate having an average particle diameter of 0.2 $\mu$m and a specific surface (BET) of 9 $m^2/g$ are suspended in 2500 parts of acetone. 5 Parts of vinyl-phosphonic acid are added dropwise within 30 minutes, while stirring thoroughly.

The working up, mixing with polyethylene and testing are effected as has been described in Example 20.

In this case, too, a comparison pattern is prepared with unmodified precipitated calcium carbonate.

The properties of the test samples have been specified in Table IV.

EXAMPLE 22

Example 21 is repeated with the proviso that instead of acetone there is used methanol and instead of vinyl-phosphonic acid use is made of octane-phosphonic acid as modifying agent for precipitated calcium carbonate. The properties of the test samples have been indicated in Table IV.

TABLE IV

| Example | elongation % | tensile strength N/mm² | impact strength mJ/mm² | tensile impact strength mJ/mm² |
|---|---|---|---|---|
| comparison with 20 | 21 | 24 | 47 | 80 |
| 20 | 42 | 24 | w/o b. | 100 |
| comparison with 21, 22 | 19 | 25 | 40 | 90 |
| 21 | 38 | 26 | w/o b. | 110 |
| 22 | 40 | 24 | w/o b. | 110 |

EXAMPLE 23

In a high-speed mixer at 1200 rpm a solution of 4.7 parts of vinyl-phosphonic acid in 4.7 parts of water is sprayed from a spray nozzle within 20 minutes onto 1100 parts of polyethylene having a density of 0.96 $g/cm^3$ and a melting index of 23 g/10 min.

1050 Parts of the polyethylene thus treated are thoroughly mixed in a plowshare mixer with 450 parts of calcium carbonate (average particle diameter 5 $\mu$m, specific surface 1 $m^2/g$).

The further processing of the mixture is effected as has been described in Example 1. The properties of the test samples have been specified in Table V.

EXAMPLE 24

Example 23 is repeated, in which process 0.04 part of tert.-butyl-hydroperoxide is additionally added into the high-speed mixer.

The further processing of the mixture is effected as has been described in Example 1. The properties of the test samples have been specified in Table V.

EXAMPLE 25

1100 Parts of polyethylene (density of 0.96 g/cm$^3$, melting index of 23 g/10 min., stabilized as in Example 1) and 7 parts of octane-phosphonic acid are mixed for 20 minutes in a high-speed mixer at 80° C.

1050 Parts of the polyethylene thus treated are mixed thoroughly in a plowshare mixer with 450 parts of calcium carbonate (average particle diameter 5 μm, specific surface 1 m$^2$/g).

The further processing of the mixture is effected as has been described in Example 1. The properties of the test samples have been described in Table V.

EXAMPLE 26

Example 25 is repeated with the modification that instead of octane-phosphonic acid there is used dodecanephosphonic acid. The properties of the test samples have been indicated in Table V.

EXAMPLE 27

At 80° C., 1050 parts of polyethylene (density of 0.96 g/cm$^3$, melting index of 23 g/10 min., stabilized as in Example 1), 450 parts of calcium carbonate (average particle diameter 5 μm, specific surface 1 m$^2$/g) and 4.5 parts of octane-phosphonic acid are mixed in a high-speed mixer for 30 minutes. The extrusion and testing are effected as has been described in Example 1.

The properties of the test samples have been specified in Table V.

TABLE V

| Example | elongation % | tensile strength N/mm$^2$ | impact strength mJ/mm$^2$ | tensile impact strength mJ/mm$^2$ |
|---|---|---|---|---|
| 23 | 30 | 28 | w/o b. | 110 |
| 24 | 30 | 28 | w/o b. | 110 |
| 25 | 42 | 26 | w/o b. | 130 |
| 26 | 38 | 22 | w/o b. | 130 |
| 27 | 42 | 28 | w/o b. | 130 |

EXAMPLES 28 to 35

Polyolefin molding compositions are manufactured from 70% by weight of polyethylene (density of 0.96 g/cm$^3$, melting index of 23 g/10 min., stabilized as in Example 1) and 30% by weight of calcium carbonate (average particle size 5 μm, specific surface 1 m$^2$/g) which has been treated with different modification agents according to Example 1.

The test samples are tested for their impact strength. The results are given in Table IV.

TABLE VI

| | adhesion promoter | | impact strength mJ/mm$^2$ | |
|---|---|---|---|---|
| Ex. | kind | amount[1] | mean value | w/o b. |
| 28 | vinyl-phosphonic acid | 1% | | 100% |
| 29 | vinyl-phosphonic acid + DCP[2] | 1% | 100% | |
| 30 | octane-phosphonic acid | 1% | 100% | |
| 31 | acrylic acid | 1% | 30% : 95 | 70% |
| 32 | acrylic acid + DCP[2] | 1% | 30% : 100 | 70% |
| 33 | maleic acid | 1% | 35% : 70 | 65% |
| 34 | maleic acid + DCP[2] | 1% | 35% : 110 | 65% |
| 35 | stearic acid | 3% | 70% : 75 | 30% |

[1]% by weight, calculated on the amount of calcium carbonate
[2]dicumyl peroxide; 0.1%, calculated on the adhesion promoter

EXAMPLE 36

500 Parts of calcium carbonate having an average particle diameter of 2.5 μm and a spefic surface (BET) of 2 m$^2$/g are suspended in 2000 parts of acetone.

0.5 Part of vinyl-phosphonic acid is added, while stirring thoroughly. The suspension is continued to be stirred for 3 hours at room temperature, subsequently the acetone is distilled off in vacuo, and the residue is dried at 40° C. in the vacuum drying cabinet.

450 Parts of the calcium carbonate thus treated are thoroughly mixed with 1050 parts of polyethylene (density of 0.96 g/cm$^3$, melting index of 23 g/10 min., containing 0.42% by weight of a phenolic stabilizer and 2.5% by weight of a sulfur-containing co-stabilizer) in a plow-share mixer.

The preparation of the test samples and their testing are effected as has been described in Example 1.

For reasons of comparison, 450 parts of untreated calcium carbonate are mixed with 1050 parts of polyethylene in the same manner and are further processed, as has been described above.

The properties of the test samples are shown in Table VII.

EXAMPLE 37

At 80° C., 500 parts of calcium carbonate having an average particle diameter of 2.5 μm and a specific surface (BET) of 2 m$^2$/g and 2.5 parts of octane-phosphonic acid are mixed for 20 minutes in a high-speed mixer at 1200 rpm. 450 Parts of the calcium carbonate thus treated are thoroughly mixed with 1050 parts of polyethylene (density of 0.96 g/cm$^3$, melting index of 23 g/10 min., stabilized as in Example 36) in a plowshare mixer.

The preparation of the test samples and their examination are effected as has been described in Example 1.

The properties of the test samples are shown in Table VII.

TABLE VII

| Example | elongation % | tensile strength N/mm$^2$ | impact strength mJ/mm$^2$ | tensile impact strength mJ/mm$^2$ |
|---|---|---|---|---|
| comparison | 20 | 23 | 40 | 80 |
| 36 | 30 | 29 | w/o b. | 120 |
| 37 | 44 | 24 | w/o b. | 110 |

EXAMPLE 38

500 Parts of calcium carbonate having an average particle diameter of 5 μm and a speficic surface (BET) of 1 m$^2$/g and 5 parts of dodecane-phosphonic acid are mixed for 20 minutes in a high-speed mixer at 1200 rpm at 80° C.

450 Parts of the calcium carbonate thus treated are thoroughly mixed with 1050 parts of polypropylene (density of 0.905 g/cm$^3$, melting index of 7 g/10 min., containing 0.5% by weight of a phenolic stabilizer and 1.75% by weight of a sulfur-containing co-stabilizer) in a plowshare mixer.

For a comparison test, 450 parts of untreated calcium carbonate are mixed in the same manner with 1050 parts of polypropylene.

The further processing of the mixtures, the preparation of the test samples and the testing are effected as has been described in Example 1.

The properties of the test samples are shown in Table VIII.

TABLE VIII

| Example | elongation % | tensile strength N/mm² | impact strength mJ/mm² | tensile impact strength mJ/mm² | E-module N/mm² |
|---|---|---|---|---|---|
| comparison | 200 | 28 | 24 | 230 | 0.96 |
| 38 | 440 | 32 | 36 | 210 | 1.32 |

EXAMPLES 39 to 45

As has been described in Example 15, the same polyethylene is mixed with varying amounts of the same calcium carbonate which has been modified with 1% by weight of octane-phosphonic acid, calculated on the amount by weight of filler, and is further processed. For reasons of comparison, mixtures with untreated calcium carbonate are prepared each time.

The properties of the test samples are shown in Table IX.

TABLE IX

| Example | % of CaCO₃ | elongation % | tensile strength N/mm² | impact strength mJ/mm² | tensile impact strength mJ/mm² |
|---|---|---|---|---|---|
| comparison | 10 | 44 | 27 | w/o b. | 130 |
| 39 | 10 | 74 | 27 | w/o b. | 140 |
| comparison | 20 | 44 | 24 | w/o b. | 110 |
| 40 | 20 | 54 | 26 | w/o b. | 120 |
| comparison | 30 | 22 | 23 | 65 | 80 |
| 41 | 30 | 40 | 23 | w/o b. | 110 |
| comparison | 40 | 19 | 21 | 23 | 85 |
| 42 | 40 | 25 | 22 | w/o b. | 100 |
| comparison | 50 | 10 | 20 | 7 | 70 |
| 43 | 50 | 15 | 21 | 66 | 85 |
| comparison | 60 | 7 | 17 | 2.8 | 60 |
| 44 | 60 | 10 | 18 | 7.0 | 70 |
| comparison | 70 | 6 | 14 | 1.8 | — |
| 45 | 70 | 8 | 15 | 4.0 | — |

What is claimed is:

1. Plastic molding composition containing a filler, which composition consists of
   from 20 to 90 parts by weight of a polyolefin,
   from 10 to 80 parts by weight of an alkaline earth metal carbonate,
common additives and from 0.1 to 10% by weight, calculated on the filler, of an adhesion promoter, said adhesion promoter comprising an organo-phosphorus compound of the formula

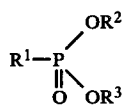

(I)

in which $R^1$ is an alkyl radical having from 1 to 18 carbon atoms, an alkenyl radical of from 2 to 18 carbon atoms, an aralkyl radical of from 7 to 13 carbon atoms, whose alkyl chain has from 1 to 3 carbon atoms, or an aralkenyl radical of from 8 to 13 carbon atoms, whose alkenyl chain has 2 or 3 carbon atoms, and $R^2$ and $R^3$, which are identical or different, represent hydrogen, an alkyl radical of from 1 to 8 carbon atoms, an aryl radical of from 6 to 10 carbon atoms, an aralkyl radical of from 7 to 13 carbon atoms, whose alkyl chain has from 1 to 3 carbon atoms, or an alkenyl radical of from 3 to 5 carbon atoms.

2. Plastic molding composition containing a filler, which composition consists of
   from 20 to 90 parts by weight of a polyethylene,
   from 10 to 80 parts by weight of an alkaline earth metal carbonate,
common additives, and from 0.1 to 10% by weight, calculated on the filler, of an adhesion promoter, said adhesion promoter comprising an organo-phosphorus compound of the formula

(I)

in which $R^1$ is an alkyl radical having from 1 to 18 carbon atoms, an alkylene radical of from 2 to 18 carbon atoms, an aralkyl radical of from 7 to 13 carbon atoms, whose alkyl chain has from 1 to 3 carbon atoms, or an aralkenyl radical of from 8 to 13 carbon atoms, whose alkylene chain has 2 or 3 carbon atoms, and $R^2$ and $R^3$, which are identical or different, represent hydrogen, an alkyl radical of from 1 to 8 carbon atoms, an aryl radical of from 6 to 10 carbon atoms, an aralkyl radical of from 7 to 13 carbon atoms, whose alkyl chain has from 1 to 3 carbon atoms, or an alkenyl radical of from 3 to 5 carbon atoms.

3. Process for preparing a plastic molding composition which comprises admixing
   from 20 to 90 parts by weight of a polyolefin,
   from 10 to 80 parts by weight of an alkaline earth metal carbonate as filler,
and from 0.1 to 10% by weight, calculated on the filler, of an organophosphorus compound of the formula

(I)

in which $R^1$ is an alkyl radical having from 1 to 18 carbon atoms, an alkenyl radical of form 2 to 4 carbon atoms, an aralkyl radical of from 7 to 13 carbon atoms, whose alkyl chain has from 1 to 3 carbon atoms, or an aralkenyl radical of from 8 to 14 carbon atoms, whose alkenyl chain has 2 or 3 carbon atoms, and $R^2$ and $R^3$, which are identical or different, represent hydrogen, an alkyl radical of from 1 to 8 carbon atoms, an aryl radical of from 6 to 10 carbon atoms, an aralkyl radical of from 7 to 13 carbon atoms, whose alkyl chain has from 1 to 3 carbon atoms, or an alkenyl radical of from 3 to 5 carbon atoms.

* * * * *